United States Patent [19]
Buhs et al.

[11] 3,818,812
[45] June 25, 1974

[54] TWO-CELL-TYPE CARTON FILLERS

[75] Inventors: Marion W. Buhs, Charlotte, Mich.; Reynold J. Cousino; Frank J. DiFrank, both of Toledo, Ohio

[73] Assignee: Owens-Illinois, Inc., Toledo, Ohio

[22] Filed: Mar. 23, 1972

[21] Appl. No.: 237,325

[52] U.S. Cl. .............................................. 93/37 R
[51] Int. Cl. ............................................. B31b 1/00
[58] Field of Search ...................... 43/37 R; 271/149

[56] References Cited
UNITED STATES PATENTS

| | | | |
|---|---|---|---|
| 2,161,124 | 6/1939 | Babice | 271/49 |
| 2,754,731 | 7/1956 | Shields | 93/37 R |
| 2,879,700 | 3/1959 | Richardson et al. | 93/37 R |
| 3,626,818 | 12/1971 | Arson | 93/37 R |
| 3,712,183 | 1/1973 | Kozlowski | 93/37 R X |

Primary Examiner—Andrew R. Juhasz
Assistant Examiner—Leon Gilden
Attorney, Agent, or Firm—Steve M. McLary; E. J. Holler

[57] ABSTRACT

Apparatus for the simultaneous assembly of two cell-type carton fillers. Machines which will insert transverse partition strips of corrugated paper material into notches formed in an advancing plurality of longitudinal partition strips of a similar corrugated material, thus assembling a cell-type filler for cartons, are well known in the art. This invention involves the use of a pair of parallel guide rails for feeding two independent sets of transverse strips to the insertion mechanism of such a machine with the two strips being simultaneously placed in the notches of two independent sets of longitudinal strips. This allows the simultaneous assembly of two cell-type fillers on a machine which previously assembled but one such filler at a time.

2 Claims, 3 Drawing Figures

PATENTED JUN 25 1974

TWO-CELL-TYPE CARTON FILLERS

BACKGROUND OF THE INVENTION

This invention relates generally to machines for assembling longitudinal and transverse strips of a corrugated paperboard material into a cell-type filler for use in cartons. More specifically, this invention relates to an improvement in such machines which allows the assembly of two such cell-type fillers for cartons simultaneously. Most particularly, this invention is a dual rail transverse strip feeding apparatus for use with such assembly machines.

The basic concept of assembling cell-type fillers for cartons by inserting, one at a time, a series of transverse partition strips in a moving plurality of longitudinal partition strips is well known in the art. For example, such a machine is shown in U.S. Pat. No. 2,754,731. A recurring problem in this art has been the difficulty in assembling cell-type carton fillers which have a relatively short transverse width. That is, the width of such assembly machines must be such as to accommodate the widest possible cell-type filler which would be assembled, since these machines are ordinarily not adjustable for the width of the cell-type filler to be assembled. Thus, in the case of a relatively narrow transverse strip, a substantial portion of the available width for assembly has been wasted. It has not been possible heretofore to assemble two cell-type fillers simultaneously using the same insertion mechanism, but rather machines which have been designed to accomplish this task have used two independent insertion mechanisms. This has led to increased expense for such machines, as well as complexity of the control circuits involved. We have found that a machine which ordinarily will assemble but a single cell-type carton filler at a time may be readily modified to assemble two such carton fillers simultaneously, assuming, of course, that the width of the two simultaneously assembled carton fillers is no more than the allowable working width of such machines, by the use of dual, parallel guide rails for feeding two independent sets of transverse strips to the insertion mechanism.

SUMMARY OF THE INVENTION

This invention is an apparatus for assembling longitudinal and cross partition panels in such a manner as to simultaneously produce two cell-type carton fillers. A set of longitudinal partitions having upwardly directed notches is conveyed in parallel toward an assembly point. A main machine frame serves to support the longitudinal partition conveyor and a reciprocating feed member. Two sets of transverse panels having downwardly directed notches are moved toward the assembly point. At the assembly point, the feed member inserts one panel from each of the two sets of second panels simultaneously into the set of longitudinal panels to thus assemble two cell-type carton fillers at once. The insertion is repeated as the set of longitudinal panels passes under the assembly point until a complete filler is formed.

DETAILED DESCRIPTION OF THE DRAWINGS

Figure 1:
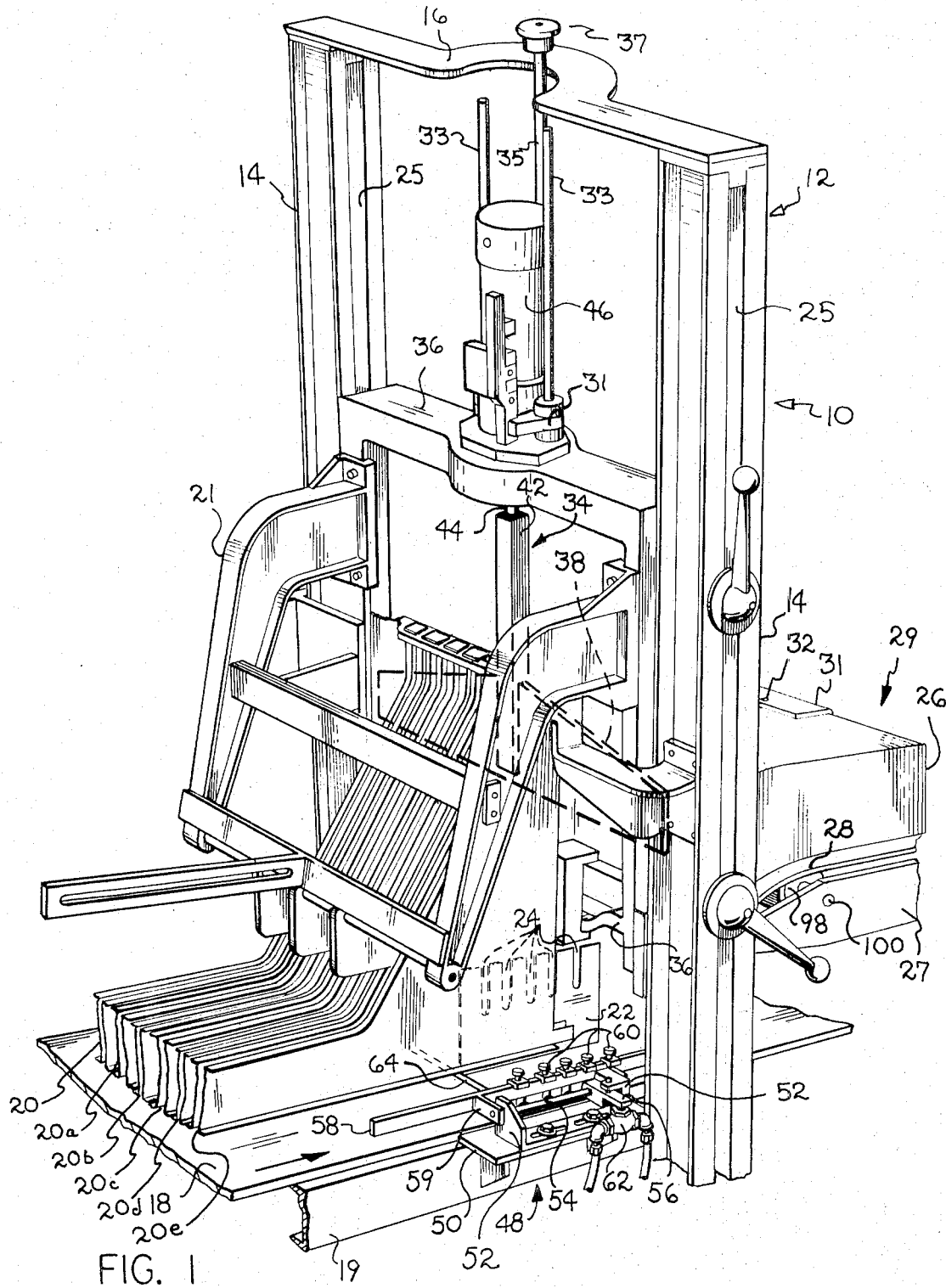
FIG. 1 is a perspective view of a portion of the apparatus of the present invention.

FIG. 1 shows an assembly apparatus indicated generally by the numeral 10. The apparatus 10 includes a frame 12, formed by a pair of vertical support columns 14 and a horizontal connecting cross beam 16. A conveyor 18, supported by a side rail 19, is provided to pass between the columns 14 of the frame 12 in a left to right direction. A plurality of longitudinal paper guides 20, 20a, 20b, 20c, 20d and 20e is positioned above the conveyor 18 and fastened to the frame 12 by a suitable suspension member 21. A plurality of longitudinal partition panels or strips 22 (only one of which is visible in FIG. 1) having slots or notches 24 formed therein, is advanced on the conveyor 18 through the guides 20–20e with the notches 24 directed upwardly. A plurality of transverse partition panels or strips 26 having downwardly directed notches 25 formed therein is carried on an inclined feed table 28 supported by a side plate 27 attached to the support columns 14. In the practice of this invention, the transverse partitions 26 are separated into two independent columns or sets 29 and 30, which are advanced forward along the incline table 28. A transverse pressure plate 31 is positioned to urge the stack of transverse partitions 26 toward the frame 12 under the action of a cable 32 which is connected at its other end to a counterweight (not shown).

A knocker bar mechanism, generally indicated by the numeral 34, includes a frame 36 which is vertically slidable for adjustment purposes relative to end channels 25 on the columns 14 of the frame 12. The knocker bar mechanism 34 includes a flat plate or knocker bar 38, which is attached to a connecting beam 42. The beam 42 is attached to a connecting rod 44 which, in turn, is fixed to a piston (not shown) mounted within an air cylinder 46. The air cylinder 46 is generally supported by the frame portion 36 and the knocker bar 38 reciprocates relative to the frame 36 and the air cylinder 46. The knocker bar 38 is positioned to reciprocate up and down adjacent to the rear edge of the paper guides 20, 20a, 20b, 20c, 20d and 20e. The vertical position of the knocker bar 38 is adjusted by means of a threaded rod 35 and a wheel 37. The rotation of the wheel 37 and the threaded rod 35 causes a cylinder mounting plate 31, to which the air cylinder 46 is attached, to move up or down on mounting posts 33, thereby raising or lowering the knocker bar 38.

The knocker bar 38 is reciprocated to insert transverse partitions 26 fed from the two independent columns 29 and 30 into the slots 24 of the advancing longitudinal partitions 22. It should be noted at this time, that there are, of course, two independent sets of longitudinal partitions 22 corresponding to the two independent columns 29 and 30 of transverse partitions 26. The reciprocation of the knocker bar 38 is controlled by a trip lever mechanism generally designated as 48. The trip lever mechanism comprises a horizontal flat plate support bracket 50 attached to the conveyor frame 19, vertically extending bearing plates 52 attached to the support bracket 50, a drive shaft 54 rotatably mounted in the bearing plates 52, a valve trip lever 56 which is fixed to the drive shaft 54 and rotates therewith, a lever bar 58 which is pivotally connected to the drive shaft 54 by projecting pivot arms 59, a series of trip levers 60 which may be slid along the length of the lever bar 58 to various positions and then locked in the position selected, and an operating valve 62 which serves to control the cycling of the air cylinder 46. The longitudinal partitions 22 are aligned with their trailing edges in contact with a flight bar 64 which is attached to the surface of and moves with the conveyor 18. In the assembly of any particular cell-type structure by this apparatus 10, the number of trip levers 60 will be equal to the number of longitudinal partition slots 24, and the position of the trip lever 60 along the lever bar 58 will be such as to place the trip lever 60 in transverse alignment with the out partition notches 24 in the longitudinal partitions 22 as the longitudinal partitions 22 pass under the knocker bar 38.

The operating function of the trip lever mechanism 48 thus described is well known to those versed in the art, as it is the commonly used mechanism on such machines which are in general utilization.

Figure 3:
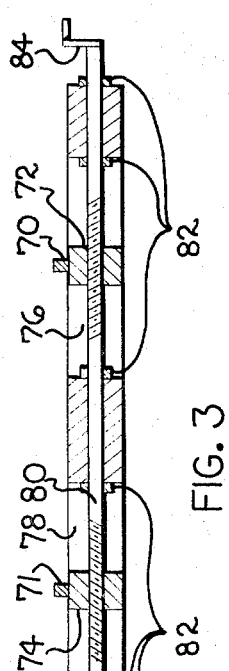
FIG. 3 is an enlarged, cross sectional view taken along the line 3—3 in FIG. 2.
Figure 2:
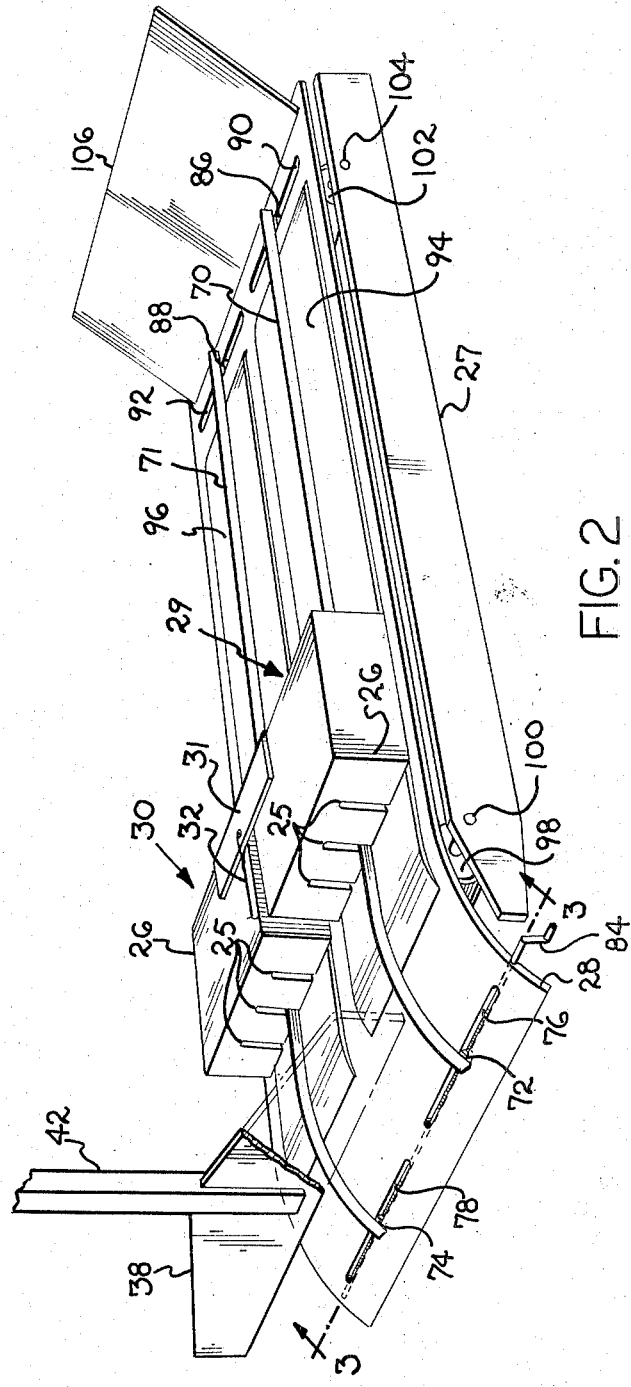
FIG. 2 is a perspective view of the dual rail, transverse panel feed table of the apparatus of FIG. 1, removed from the apparatus of FIG. 1 and on an enlarged scale.

Turning now to FIGS. 2 and 3, two rails 70 and 71 for the two columns 29 and 30 of transverse partitions 26 may be easily seen. It will be appreciated that under normal conditions, the two columns 29 and 30 would actually extend forward into the area of the knocker bar 38; however, this portion of the columns 29 and 30 has been removed in FIG. 2 to allow the details of the dual rail feed system to be seen. One set of notches 25, in the column 30, is engaged with the rail 71, and one set of notches, in the column 29, is engaged with the rail 70. The pressure plate 31 serves to urge the two columns 29 and 30 forward as units to ensure proper feeding of one transverse partition 26 from each of the columns 29 and 30 by the knocker bar 38. The front portions of the rails 70 and 71, adjacent the knocker bar 38, are attached to two respective slide blocks 72 and 74. As best seen in FIG. 3, the slide blocks 72 and 74 are mounted in two transverse slots 76 and 78 formed in the table 28. An elongated adjusting screw 80 extends through the width of the table 28. The adjusting screw 80 is rotatable, with the adjusting screw 80 being held in position by a plurality of retaining rings 82, while a crank 84 is attached to one end of the adjusting screw 80. The adjusting screw 80 passes through and is threadably engaged with both of the slide blocks 72 and 74. Thus, as the crank 84 is turned to rotate the adjusting screw 80, the blocks 72 and 74 will be moved toward or away from one another as a unit, depending upon the direction of rotation. This will, of course, adjust the transverse spacing of the rails 70 and 71 to accommodate sets of transverse partitions 26 of varying widths. The rear portions of the rails 70 and 71 are attached to two respective rear slide blocks 86 and 88. The rear slide blocks 86 and 88 are trapped in two transverse slots 90 and 92 formed in the rear portion of the table 28. There is no adjusting screw provided for the rear portions of the rails 70 and 71, since the engagement of the rear slide blocks 86 and 88 in the slots 90 and 92 ensures that the rear portions of the rails 70 and 71 will follow the movement of the front portions. The rear slide blocks 86 and 88 may be locked in position with simple set screws (not shown) once an adjustment has been made.

Two endless belt-type conveyors 94 and 96 are mounted under the rails 70 and 71 in longitudinal openings in the table 28. The conveyors 94 and 96 are trained around a drive roll 98 rotatably mounted on a drive shaft 100 carried by the side plate 27, and an idler roll 102 rotatably mounted on an idle shaft 104 carried by the side plate 27. It should be understood that there is a second side plate, similar to 27 and not visible in FIG. 2, which completes the supporting structure for the table 28 and the shafts 100 and 104. The conveyors 94 and 96 are vertically positioned slightly above the plane of the table 28, so as to contact the lower portions of the columns 29 and 30. Furthermore, the conveyors are continuously driven by a suitable drive means not shown in FIG. 2. Thus, the two columns 29 and 30 of transverse partitions 26 contact the conveyors 94 and 96 and are urged forward toward the knocker bar 38 by the movement of the conveyors 94 and 96. An inclined loading plate 106 is attached to the rear of the table 28 adjacent the slots 90 and 92. The loading plate 106 is used as an aid in loading new transverse portions 26 onto the rails 70 and 71.

While the foregoing description has been limited to two columns 29 and 30 of transverse partitions 26, it should be clear that more than two columns of transverse partitions 26 may be utilized. That is, there may be circumstances in which the width of the conveyor 18 may best be utilized if a plurality of cell-type carton fillers are assembled simultaneously. In such a situation, the number of columns of transverse partitions 26 would be equal to the number of cell-type carton fillers being simultaneously assembled.

What I claim is:

1. Apparatus for assembling longitudinal panels and transverse panels to simultaneously produce a plurality of cell-type fillers for cartons comprising, in combination: a frame member; conveying means attached to said frame member for continuously moving a plurality of longitudinal panels having a plurality of longitudinally spaced, upwardly directed notches, longitudinally toward and through an assembly point in parallel, horizontally spaced-apart alignment with the upwardly directed notches in horizontal alignment; an inclined feed table terminating adjacent said assembly point; at least two spaced-apart longitudinal rails, substantially coextensive with said table, mounted parallel to one another on said table; means for transporting at least two independent columns of transverse panels, having downwardly directed notches horizontally spaced at a distance equal to the horizontal spacing of said notches in said longitudinal panels, to said assembly point at a level above said longitudinal panels in a direction parallel to the direction of travel of said longitudinal panels, said columns of transverse panels each having an individual one of said rails engaging said downwardly directed notches thereof for guiding said columns of transverse panels; means connected to said rails for adjusting the horizontal separation of said longitudinal rails as a unit; a reciprocating feed member carried by said frame member at said assembly point for propelling one transverse panel from each of said plurality of columns of transverse panels downward simultaneously to an inter-engaging position with a horizontally aligned plurality of upwardly directed notches in said longitudinal panels; drive means for reciprocating said feed member; and control means responsive to the passage of said longitudinal panels for initiating the downward movement of said feed member as each horizontally aligned plurality of upwardly directed notches approaches said assembly point to thereby move one panel from each of said plurality of columns of transverse panels into inter-engagement with a horizontally aligned plurality of upwardly directed notches in said longitudinal panels, and thereby sequentially producing a plurality of cell-type carton fillers simultaneously.

2. The apparatus of claim 1, wherein said plurality of rails comprises two, and wherein said table is formed with first and second transversely extending slots adjacent said reciprocating feed member, said first and second slots being longitudinally aligned and horizontally spaced apart, and third and fourth transversely extending slots adjacent the rear of said table, said third and fourth slots being longitudinally aligned and horizontally spaced apart, and wherein said means for adjusting the horizontal separation of said longitudinal rails comprises, in combination: a first slide block, attached to one of said rails, slideably mounted in said first slot; a second slide block, attached to the other one of said rails, slideably mounted in said second slot; a rotatably mounted adjustment screw passing through said first and second slots and threadably engaged with said first and second slide blocks; a third slide block, attached to one of said rails, slideably mounted in said third slot; and a fourth slide block, attached to the other one of said rails, slideably mounted in said fourth slot.

* * * * *